Figure 1:
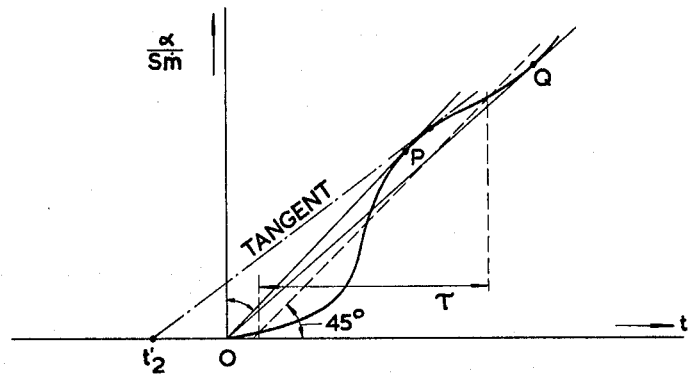

United States Patent Office 3,263,760
Patented August 2, 1966

3,263,760
WEIGHING MACHINE
Arnoud Waller, Rotterdam, Netherlands, assignor to Albatros Superfosfaatfabrieken N.V., a Dutch corporation
Filed Apr. 29, 1964, Ser. No. 363,493
2 Claims. (Cl. 177—60)

This application contains subject matter in common with my patent application Serial No. 80,090, filed January 3, 1961, now abandoned, and is a continuation-in-part of the latter.

The invention relates to a weighing machine for automatically weighing given quantities of fluent material, including a weighing mechanism with a receptacle for the material, to which the material can be fed, an abutment with which a balance may cooperate, and means controlled by the weighing mechanism for interrupting flow of the material to the receptacle.

According to an earlier proposal (U.S. Patent No. 2,923,517 Arnoud Waller) it was described how a weighing machine had to be designed to ensure that the weighing errors due to a finite closing time ($t_1$) of the valve shutting off the flow of the material and to a finite adjusting time ($t_2$) of the weighing mechanism can be eliminated, while the final weight also becomes independent of the intensity of the flow of the material. In this older proposal both $t_1$ and $t_2$ had to be essentially positive constants, while also the vertical velocity component $v_0$ of the feed at the level of the valve had to be essentially positive. In practice it has now been found that $v_0$ has to amount to at least 150 cm./sec. if it is to satisfy this relation. For many materials this forms no objection, because the speed of falling at the level of the material in the weighing pan can always be small enough to prevent interference owing to the resistance of the air. However, if this resistance does play a part, the required value of the amount of the compensation, obtained from the impulse of the material acting upon the weighing pan and the quantity of material falling after the valve has shut, may not be reached and the automatic compensation is not obtained. Such a phenomenon may occur, for instance, if the material weighed consists of powders of such fineness that their fall is interfered with by the resistance of the air. This means that if the amount of the flow of material is changed, a different compensating weight would have to be put on the balance, which is naturally contrary to the desired automatic compensation. It has also been found (see U.S. Patent No. 2,634,082) that the period of the undamped balance has to be chosen so short that special measures preventing disturbances owing to outward vibrations are required.

The object of the invention is to design a weighing machine in such a way that at least within certain limits the final weight becomes independent of the filling rate, even when the speeds of falling of the material are such that the vertical component is zero or negative, while moreover the period can be so chosen that outward disturbances hardly affect the accuracy, if at all. This object is achieved according to the inveniton by the feature that the weighing machine has a balance with additional parts swinging therewith with a swinging period ($\tau$) such that the mass ($\Delta m$) which, assuming stationary equilibrium conditions, has to be added to the receptacle to bring the balance from the stationary equilibrium position in which it just fails to rest against an abutment, with which the balance may cooperate to the stationary equilibrium position in which it operates the interrupting means, divided by said period ($\tau$), is higher than six-tenths of the normal average filling rate ($dm/dt$) for which the weighing machine is designed, preferably close to nine-tenths of the said filling rate, $$\left(\frac{\Delta m}{\tau} > 0.6 \frac{dm}{dt}\right)$$

preferably $\Delta m/\tau$ about 0.9. $dm/dt$), and in that an adjustable damping member is operatively associated with said balance.

Figure 2:
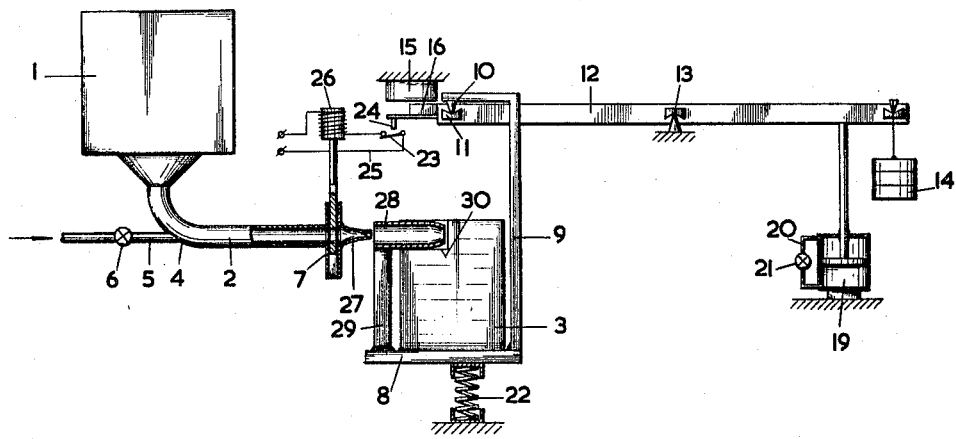

The invention will now be described in greater particularity, with reference to the accompanying drawing, in which FIG. 1 is a diagram of a graph representing the relationship between elapsed time and angular rotation of the beam of the balance; and FIG. 2 diagrammatically illustrates a weighing machine in accordance with the present invention.

The invention is based on the idea of taking advantage of a given part of the periodically retarded and accelerated motion of a balance in relation to the uniform motion it would have if at the start a given velocity, dependent on the filling rate, were imparted to the balance.

This will be explained by means of the accompanying diagram (FIGURE 1).

It is assumed that $m$=mass (in grams) in the receptacle
$\dot{m}=dm/dt$=so-called filling rate, in grams per second
$\Delta t$=time (in seconds) elapsed between the moment the balance is released and the moment it operates the interrupting means
$\Delta m$=mass (grams), for a filling rate so low, that at any moment stationary equilibrium conditions may be assumed, to bring the balance from a "stop" position to a position in which it operates a means for interrupting the filling
$\tau$=swinging period of the balance (in seconds)
$\alpha$ (the Greek letter "alpha")=angular rotation (in radians) of the beam of the balance
At $t$=0, both $\alpha$ and $d\alpha/dt$ are 0
$\Delta\alpha$=angular rotation (in radians) corresponding to $\Delta t$
$s$=constant, the so-called sensitivity of the balance= $\Delta\alpha/\Delta m$ (in radians per gram (mass))

The product $\dot{m}\Delta t$ for various filling rates, which are considered to be constant for each weighing operation, is considered, viz. for the case where the damping of the balance is linear and less than critical. For values of $\Delta m/\tau$ between 0.75 and 1.23 of the filling rate, $\dot{m}\Delta t$ is found to decrease as the value of $\dot{m}$ increases. In this way the possibility of compensation for the weighing error due to the equivalent closing time is obtained, which error indeed increases as the filling rate increases.

The behaviour of $\dot{m}\Delta t$ is explained with the aid of the graph of FIGURE 1, in which the value of $\alpha/s\dot{m}$ of the balance is given as a function of the time $t$ reckoned from the moment the balance is released.

For any constant value of $\dot{m}$ the curve indicates the variation of $\alpha$ with $t$. For a fixed value of $\alpha$ ($\alpha=\Delta\alpha$) the curve indicates the relation between $$\frac{\Delta\alpha}{s\dot{m}}=\frac{\Delta m}{\dot{m}}$$

and $\Delta t$.

The value $t_2'$ of the point of intersection of a tangent to the curve with the abscissa is found to be equal to $$\frac{d(\dot{m}\Delta t)}{d\dot{m}}$$

Tangents to the curve through the origin O touch the curce in P and Q.

It is seen that between P and O the value $t_2'$ is negative and also varies only slightly. In this invention $t_2'$ as it were takes the place of the adjusting time $t_2$ from U.S. Patent 2,923,517, Arnoud Waller.

Since it must be possible for the damping to be deliberately set and maintained at a particular value below the critical damping value, the presence of an adjustable damping member is essential, and damping should not be left to the constantly present resistance due to friction and to the resistance of the air. Moreover it sometimes proves impossible to design the weighing machine without means for producing an additional directing force, such as a spring on the weighing beam. In such a case the adjustable damping member can be combined with the said means to form one auxiliary device, which is connected to the balance.

It has been found that in addition to the advantages which the invention presents over automatic compensation of the weighing errors it is also ensured that the fixed compensating weight is considerably smaller than the weight usually required in the known weighing machines with small damping and a long period. This implies that the amount of underweight which arises if owing to special circumstances (such as clogging or defective feed) the flow of the material becomes very small is much smaller than in the known weighing machines operating at the same rate. This shortweight is now less than one tenth of the average filling rate multiplied by the period.

The diagram may serve once more to illustrate the above.

It is seen that beyond P the value of $$\frac{\text{abscissa}}{\text{ordinate}}$$

which is evidently equal to $$\frac{\dot{m}\Delta t}{\Delta m}$$

departs only slightly from 1.

The above exposition is directly applicable to a weighing machine operating with a main flow and a secondary (dribble) flow of material. In such case it relates to the secondary filling period. However, it is advisable in the case of a main flow and a secondary flow to make provision for carrying out the invention for the main flow as well as the secondary flow since not only should the final weight—obtained at the end of the weighing cycle—be made as independent as possible from the dribble rate, but also the same applies to the weight obtained at the moment the main flow is stopped. If there is only one flow, the above exposition will also be fully applicable, provided that the word "leader" has to be replaced by the term "fixed stop."

The invention is applied in particular when bags have to be filled with a powdered material which is fed to the bag by pneumatic conveyors via a horizontal tube, so that there is practically no free falling height, and the means for interrupting the flow of material are situated at the same level as the receptacle.

If the weighing machine is so constructed, in a manner known per se, that the damping force throughout the weighing cycle is proportional to the velocity of movement of the weigh-beam arm, as illustrated in FIG. 2, members 19, 20 and 21, to be described in the paragraph immediately following, the value of the quotient $\Delta m/\tau$, referred to above, is less than 1.3 of the filling rate. This means that the operator's liberty of choice of the parameters $\Delta m$ and $\tau$ in the weighing machine in a given time of the cycle or total weighing time is limited by the values of the quotient $\Delta m/\tau$ lying between 0.6 and 1.3 of the filling rate.

FIG. 2 of the accompanying drawing is a schematic representation of apparatus for use in carrying out the present invention. In the drawing, a supply of fluent material to be weighed out is contained in hopper 1. The hopper communicates by way of a conduit 2 with a bag 3 into which the fluent material is to be delivered. The conduit 2 contains a curve 4 so that the material, which flows vertically downwards out of hopper 1, can be fed horizontally to the bag 3, it being conveyed through conduit 2 and into the bag 3 by air under pressure admitted through air inlet 5 with valve 6.

Conduit 2 is provided with valve means 7. Bag 3 is supported on a weighing platform 8 which is suspended through means 9, 10, 11 to a weighing beam 12 with a fulcrum 13 about midway its length, weights 14 being suspended to the beam at the end thereof opposite to the end supporting the bag.

There is provided a stop or abutment 15, limiting the upward movement of the platform 8 and contacting a part 16 at the end of beam 12. Abutment 15 as shown in the drawing acts as a fixed stop towards the end of the weighing, giving the beam 12 a fixed position, even before it starts moving during the latter part of the weighing cycle. At the moment beam 12 starts moving "$t$" in FIG. 1 equals 0, and parts 15 and 16 (FIG. 2) will no longer be in mutual contact. This applies also in case abutment 15 is spring-loaded as would be the case if the feed rate were high initially, followed by a smaller feed rate during the latter part of the weighing cycle.

The beam 12 or another part of the weighing beam is connected to a damper 19. The damper is shown as of well-known simple form based on the hydraulic principle with a piston in a cylinder, a by-pass 20 with valve 21 therein connecting both ends of the cylinder and thus allowing the oil in the system to by-pass the piston. The damping can be controlled by adjusting the valve 21.

A spring 22 gives a suitable directing force additional to the natural directing force obtained by the gravity of the beam etc. engaging in the centre of gravity of the beam and adjacent parts below the fulcrum and giving a directing force when said centre of gravity is moved to the side of a vertical line through the fulcrum.

An electric switch 23 is provided stationary below the end of the beam 12 at 16 and the beam 12 carries a downwardly protruding part 24 to open said switch, which is normally kept closed, e.g. by spring means (not shown). From the two contacts of said switch means electrical conductors 25 extend to solenoid valve control means 26.

From valve means 7 a discharging nozzle 27 extends towards the bag and it feeds the material into a guide tube 28 being supported by a post 29 on the weighing platform 8. The guide tube 28 extends into a suitable flap opening 30 of the bag 3.

When filling the bag 3 air under pressure is admitted through inlet 5 and valve 6. The valve in the valve means 7 is open and thus with a bag 3 placed on the weighing platform 8 the material to fill the bag 3 flows downwards from hopper 1, in which it is stored, into duct 2,4, and is blown by said air through nozzle 27 and guide tube 28 into the bag. The bag becomes heavier during the filling and so from a certain amount of filling the weighing platform 8 begins to move downwardly so that contact between parts 15 and 16 is severed. The downward movement of weighing platform 8 is damped by the damping means 19. After a slight downward movement the part 24 on the beam opens the switch 23 so that the electric current through the conductors 25 is interrupted and the valve means 7 are closed.

The invention is suited not only for weighing means with short but also with long periods of oscillation. An important advantage is that the sensitivity may be low and that nevertheless a very accurate weighing can be reached also with a rate of filling which cannot be kept exactly constant.

What I claim is:

1. A weighing machine for automatically weighing given quantities of fluent material, which comprises a weighing mechanism including a balance assembly having a swingable balance part;
a receptacle to which fluent material to be weighed can be fed which receptacle is supported on said balance assembly;
means for feeding such fluent material to said receptacle;
an abutment located in co-operative relation to said swingable balance part;
an adjustable damping member operatively associated with said swingable balance part; and
means controlled by said swingable balance part for interrupting flow of fluent material from said feeding means,
said weighing mechanism being characterized in that said swingable balance part swings with a swinging period ($\tau$) such that the mass ($\Delta m$) which, assuming stationary equilibrium conditions, has to be added to the receptacle to bring said swingable balance part from the stationary equilibrium position in which it just fails to rest against said abutment to the stationary equilibrium position in which it operates the interrupting means, divided by said period ($\tau$), is higher than six-tenths of the normal average filling rate ($dm/dt$) for which the weighing machine is designed, preferably close to nine-tenths of the said filling rate.

2. A weighing machine according to claim 1, in which damping throughout the weighing cycle is linear the invention being further characterized in that the value of $\Delta m/\tau$ is below 1.3 of the normal average filling rate for which the weighing machine is designed.

References Cited by the Examiner

UNITED STATES PATENTS

| | | | |
|---|---|---|---|
| 1,091,349 | 3/1914 | Klingler | 117—116 |
| 1,706,966 | 3/1929 | Reeves et al. | 117—46 |
| 2,605,075 | 7/1952 | Brown | 177—78 |
| 2,634,082 | 4/1953 | Knobel | 177—116 |
| 2,781,994 | 2/1957 | Lindstaedt et al. | 177—120 X |
| 2,823,005 | 2/1958 | Lindars | 177—80 |
| 2,955,796 | 10/1960 | Titchenal | 177—120 X |

RICHARD B. WILKINSON, *Primary Examiner.*

LEO SMILOW, *Examiner.*

S. J. TOMSKY, *Assistant Examiner.*